Patented Mar. 20, 1923.

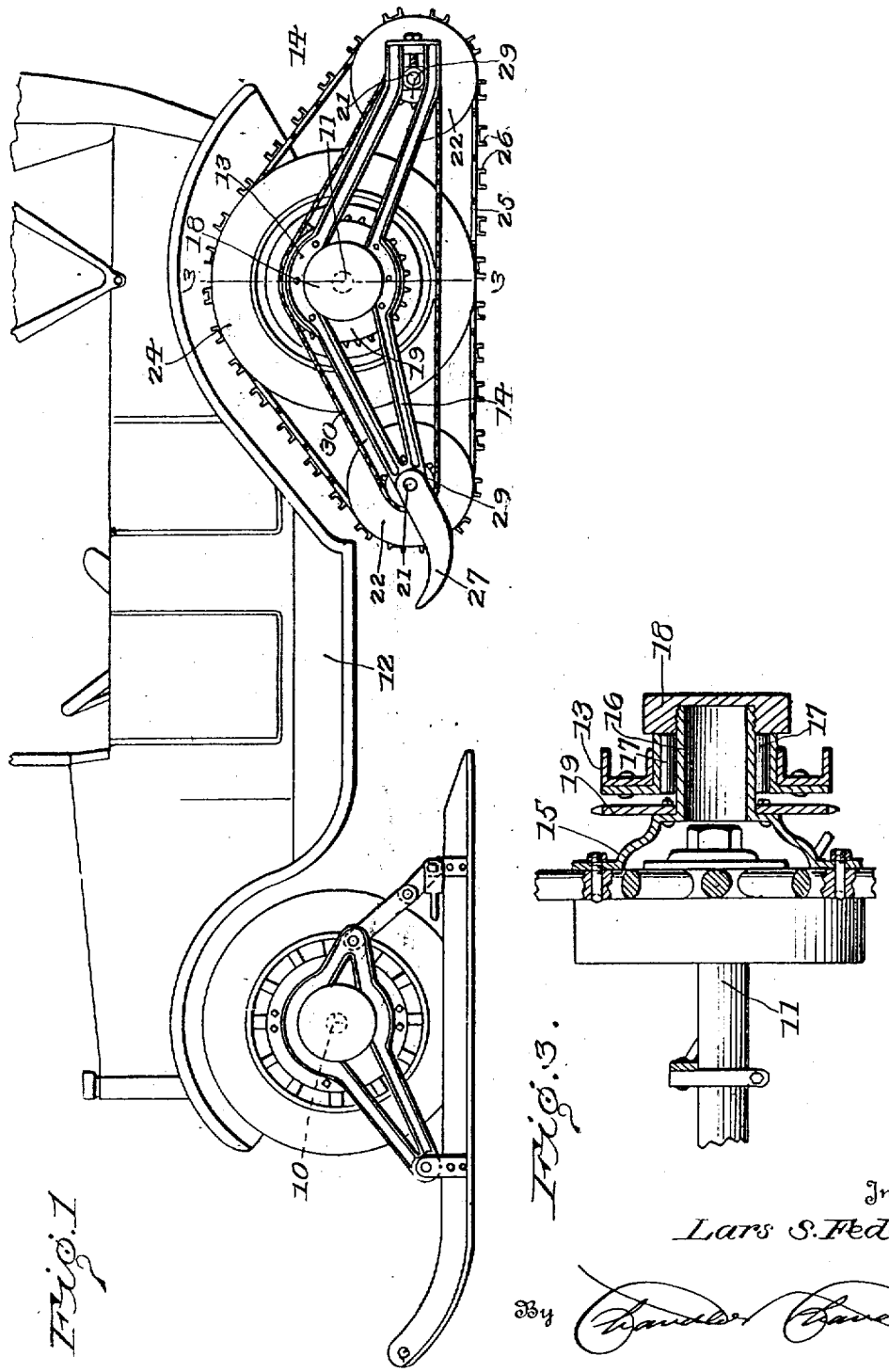

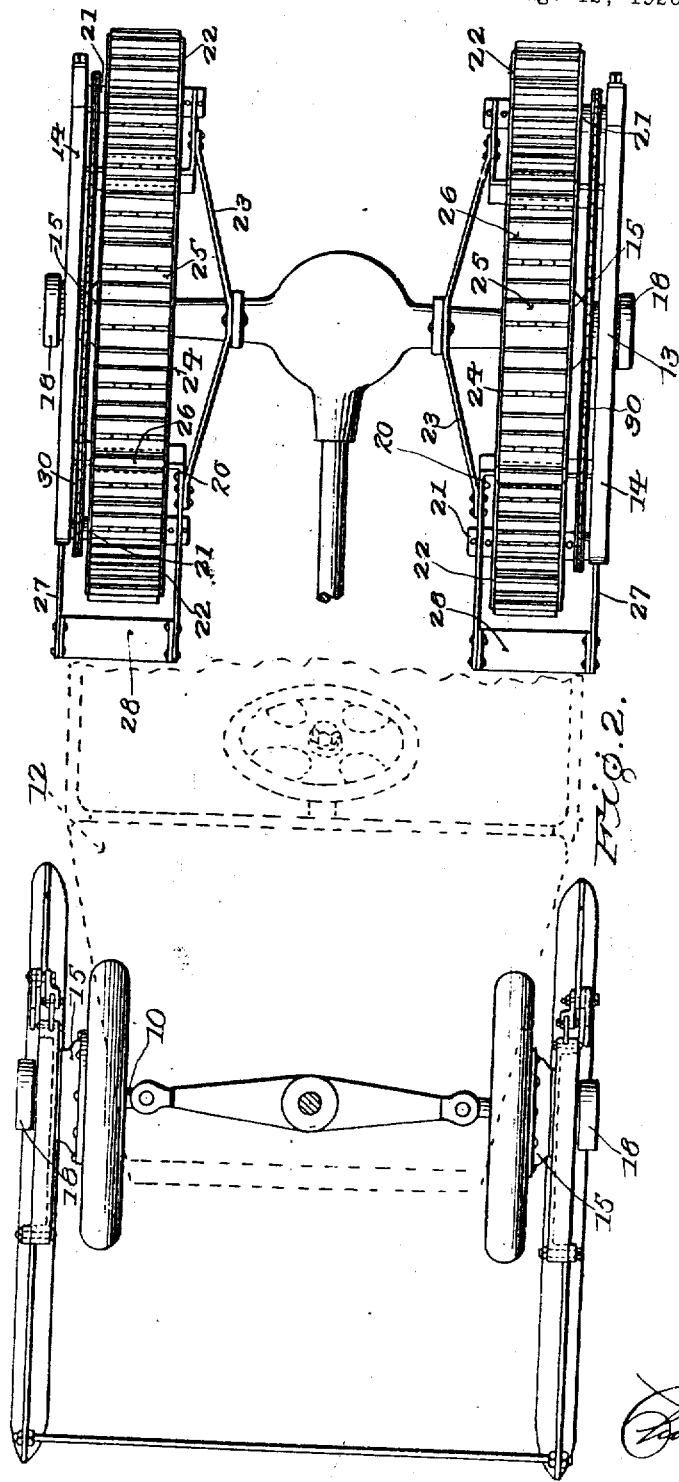

1,449,036

UNITED STATES PATENT OFFICE.

LARS S. FEDEN, OF SANDPOINT, IDAHO.

AUTOMOBILE SLEIGH ATTACHMENT.

Application filed August 12, 1920. Serial No. 403,057.

*To all whom it may concern:*

Be it known that I, LARS S. FEDEN, a citizen of the United States, residing at Sandpoint, in the county of Bonner, State of Idaho, have invented certain new and useful Improvements in Automobile Sleigh Attachments; and I do hereby declare the following to be a full, clear, and exact description of the invention, such as will enable others skilled in the art to which it appertains to make and use the same.

This invention relates to new and useful improvements in attachments for automobiles, and particularly to sleigh attachments therefor.

One object of the present invention is to provide a novel and improved device of this character which can be easily and quickly applied to an automobile without radical modifications thereto.

A further object is to provide a novel and improved driving means between the rear wheels of the automobile and the traction belts.

Other objects and advantages will be apparent from the following description when taken in connection with the accompanying drawings.

In the drawings:

Figure 1 is a side elevation of an automobile equipped with my improved runners and driving means.

Figure 2 is a top plan view of the same, portions of the automobile being broken away to expose the parts of the invention.

Figure 3 is an enlarged vertical transverse sectional view taken on the line 3—3 of Figure 1, through the rear axle and driving means.

Referring particularly to the accompanying drawings, 10 represents the front axle and 11 the rear axle of the automobile 12, in connection with which the invention is used.

A metal frame including the central circular portion 13 and the downwardly and longitudinally extending arms 14, is disposed outwardly of each of the rear wheels of the automobile. Secured to each wheel and covering the hub cap thereof, is a cup-shaped member 15, and extending outwardly from the center of the member 15 is a tubular member 16. This tubular member is disposed within the circular portion 13 and between the portions 13 and 16 are disposed the roller bearings 17. A cup 18 is engaged on the outer end of the member 16 to retain the parts in proper position. Secured to the cup 15 is a sprocket wheel 19, the purpose of which will presently appear.

Secured to the inner face of each end of the frame which includes the arms 14, is an L-shaped bracket 20, and disposed transversely and rotatably through the outer ends of the arms 14 and the brackets 20, is a shaft 21. Mounted on each shaft, between the arm and the bracket, is a wheel 22 having a wide tread, as shown in the plan view. Connected to each of the brackets and extending inwardly and connected to the axle, is a brace arm 23, which cooperate to hold the arms rigid. The rear wheels 24 of the automobile are disposed between the brackets 20, as seen in the top plan view. Engaged around the wheels 22, and over and under the tire of the rear wheel 24, is an endless traction belt 25, the same being composed of a fabric body and metal channel tread members secured to the outer face thereof, as shown at 26. Secured to the forwardly extending arm 14, at each side of the automobile, are the forwardly extending parallel arms 27 between which extend and to which are secured the curved fender plates 28, which are adapted to prevent the piling up of snow in front of the traction belt.

Carried by each of the small wheels 22 is a sprocket wheel 29, and engaged around these sprockets is an endless drive chain 30, the intermediate portion of its upper lap engaging over the sprocket wheel 19. Thus, when the rear wheels of the automobile are driven motion will be transmitted through the chains 30 to the wheels 22 to drive the traction belt 25, with the result that the automobile will be propelled forwardly or backwardly.

What is claimed is:

1. The combination with the rear wheel of a motor driven vehicle, of a frame including a central hub encircling portion and forwardly and rearwardly extending arms, a hub carried sprocket, small sprockets carried by the extremities of the said arms, large sprockets carried by the extremities of the said arms, a drive chain engaged with the small sprockets and the hub sprocket, and an endless traction belt engaged around the large sprockets and the upper and lower portions of the tread of the rear wheel.

2. The combination with the rear wheel of a motor driven vehicle of a frame having a central circular portion encircling the hub of the wheel and within which the hub is rotatable, bearings between the hub and the circular portion, a sprocket wheel fixed on the hub, arms on the circular portion extending respectively forwardly and rearwardly therefrom, a transverse shaft in the extremity of each of said arms, a large sprocket wheel and a small sprocket wheel mounted on each of the transverse shafts, an endless chain engaged around the small sprockets and over the hub carried sprocket, and a tractor belt engaged around the large sprockets and over and under the tread portion of the said rear wheel.

In testimony whereof, I affix my signature, in the presence of two witnesses.

LARS S. FEDEN.

Witnesses:
J. W. BAUER,
G. LACHELSON.